US007630962B2

(12) United States Patent (10) Patent No.: US 7,630,962 B2
Napper et al. (45) Date of Patent: Dec. 8, 2009

(54) ELECTRONIC FILING SYSTEM SEARCHABLE BY A HANDWRITTEN SEARCH QUERY

(75) Inventors: Jonathon Leigh Napper, Balmain (AU); Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 415 days.

(21) Appl. No.: 10/502,575

(22) PCT Filed: Jan. 13, 2003

(86) PCT No.: PCT/AU03/00028

§ 371 (c)(1), (2), (4) Date: Jul. 28, 2004

(87) PCT Pub. No.: WO03/065246

PCT Pub. Date: Aug. 7, 2003

(65) Prior Publication Data

US 2005/0154707 A1 Jul. 14, 2005

(30) Foreign Application Priority Data

Jan. 31, 2002 (AU) .................................... PS 0203

(51) Int. Cl.
*G06F 17/30* (2006.01)
(52) U.S. Cl. ........................................... 707/3; 715/863
(58) Field of Classification Search ....................... None
See application file for complete search history.

(56) References Cited

U.S. PATENT DOCUMENTS 4,864,618 A 9/1989 Wright et al.

| 5,051,736 | A | | 9/1991 | Bennett et al. |
| 5,477,012 | A | | 12/1995 | Sekendur |
| 5,652,412 | A | | 7/1997 | Lazzouni et al. |
| 5,661,506 | A | | 8/1997 | Lazzouni et al. |
| 5,692,073 | A | | 11/1997 | Cass |
| 5,809,498 | A | | 9/1998 | Lopresti et al. |
| 5,832,474 | A | * | 11/1998 | Lopresti et al. ................ 707/2 |
| 5,852,434 | A | | 12/1998 | Sekendur |

(Continued)

FOREIGN PATENT DOCUMENTS

| EP | 686931 B1 | 3/2000 |
| EP | 0691623 B1 | 10/2001 |
| GB | 2306669 A | 5/1997 |
| WO | WO 99/18487 A2 | 4/1999 |
| WO | WO 99/50787 A1 | 10/1999 |
| WO | WO 00/72125 A1 | 11/2000 |

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

*Primary Examiner*—John E Breene
*Assistant Examiner*—Thu-Nguyet Le

(57) ABSTRACT

A method of providing an electronic filing system which is searchable using a handwritten search query, the method including the steps of: obtaining the handwritten search query using an input device; performing a search of at least one database based on a comparison between the handwritten search query and handwritten annotations made on interactive pages stored in the at least one database; and, providing the results of the search to a user and facilitating access to at least one interactive page identified in the results of the search. An apparatus is also disclosed. Preferably, the interactive page is provided to the user in the form of printed paper, and the handwritten annotations are user handwriting, symbols, drawings, indicia or the like.

13 Claims, 4 Drawing Sheets

U.S. PATENT DOCUMENTS

| | | | |
|---|---|---|---|
| 6,076,734 A | 6/2000 | Dougherty et al. | |
| 6,130,962 A | 10/2000 | Sakurai | |
| 6,212,297 B1 * | 4/2001 | Sklarew | 382/189 |
| 6,459,442 B1 * | 10/2002 | Edwards et al. | 715/863 |
| 6,525,716 B1 * | 2/2003 | Makino | 345/173 |
| 6,681,044 B1 * | 1/2004 | Ma et al. | 382/185 |
| 6,752,317 B2 * | 6/2004 | Dymetman et al. | 235/462.45 |
| 6,964,374 B1 | 11/2005 | Djuknic et al. | |

* cited by examiner

1

ELECTRONIC FILING SYSTEM SEARCHABLE BY A HANDWRITTEN SEARCH QUERY

CROSS REFERENCES TO RELATED APPLICATIONS

The present application is a 371 of PCT/AU03/00028 filed on Jan. 13, 2003.

TECHNICAL FIELD

The present invention broadly relates to an electronic filing system and digital processor implemented handwriting searching or recognition systems, and in particular, to a method of and apparatus for providing an electronic filing system which is searchable by, or indexed by, a handwritten (i.e. hand-drawn) search query, or in other words, a digital ink query.

BACKGROUND ART

"ink query" as used herein refers to a series of hand-drawn digital ink strokes prepared by a user as a search term or phrase.

The increasing use of pen computing and the emergence of paper-based interfaces to networked computing resources (for example see: P. Lapstun, *Netpage System Overview*, Silverbrook Research Pty Ltd, Jun. 6, 2000; and, Anoto, "Anoto, Ericsson, and Time Manager Take Pen and Paper into the Digital Age with the Anoto Technology", Press Release, Apr. 6, 2000), has highlighted the need for techniques which are able to store, index, and search (raw) digital ink. However, searching handwritten text is more difficult than traditional text (e.g. ASCII text) searching due to inconsistencies in the production of handwriting and the stylistic variations between writers.

The traditional method of searching handwritten data in a digital ink database is to first convert the digital ink database and corresponding search query to standard text using pattern recognition techniques, and then to match the query text with the converted standard text in the database. Fuzzy text searching methods have been described, see P. Hall and G. Dowling, "Approximate String Matching", *Computing Surveys*, 12(4), pp. 381-402, 1980, that perform text matching in the presence of character errors, similar to those produced by handwriting recognition systems.

However, handwriting recognition accuracy remains low, and the number of errors introduced by handwriting recognition (both for the database entries and for the handwritten query) means that this technique does not work well. The process of converting handwritten information into text results in the loss of a significant amount of information regarding the general shape and dynamic properties of the handwriting. For example, some letters (e.g. 'u' and 'v', 'v' and 'r', 'f' and 't', etc.) are handwritten with a great deal of similarity in shape. Additionally, in many handwriting styles (particularly cursive writing), the identification of individual characters is highly ambiguous.

The Netpage System

Pen-based computing systems provide a convenient and flexible means of human-computer interaction. Most people are very familiar with using pen and paper. This familiarity is exploited by known systems which use a pen-like device as a data entry and recording mechanism for text, drawings or calculations which are quite naturally supported by this medium. Additionally, written ink is a more expressive format than digital text, and ink-based systems can be language-independent. Moreover, the majority of published information is distributed in paper form, and most people prefer reading printed material to reading information on screen-based terminals. However, online applications and publishing systems have a number of advantages over pen and paper, such as the ability to provide information on demand, document navigation via hypertext, and the ability to search and personalize the information.

The Netpage system, see Silverbrook Research, *Netpage System Design Description*, 8 Sep., 2000, provides an interactive paper-based interface to online information by utilizing pages of invisibly coded paper (also referred to herein as an interactive page) and an optically imaging pen. Each interactive page generated by the Netpage system is uniquely identified and stored on a network server, and all user interaction with the interactive page (i.e. paper) using the Netpage pen is captured, interpreted, and stored. Memjet digital printing technology, see Silverbrook Research, *Memjet*, 1999, facilitates the on-demand printing of Netpage documents, allowing interactive applications to be developed. The Netpage printer, pen, and network infrastructure provide a paper-based alternative to traditional screen-based applications and online publishing services, and supports user-interface functionality such as hypertext navigation and form input.

Netpage is a three-tiered system comprising a client layer, a service layer, and an application layer, as depicted in FIG. 1. The client layer contains the Netpage pen, Memjet printer, and a digital ink relay. Typically, the printer receives a document from a publisher or application provider via a broadband connection, which is printed with an invisible pattern of infrared tags that encodes each page with a unique identifier and the location of the tag on the page. As a user writes on the page, the imaging pen decodes these tags and converts the motion of the pen into digital ink, see Silverbrook Research, *Netpage Pen Design Description*, 27 Apr., 2000. The digital ink is transmitted over a wireless channel to a relay base station, and then sent to the service layer for processing and storage.

The service layer consists of a number of services that provide functionality for application development, with each service implemented as a set of network servers that provide a reliable and scaleable processing environment. The infrastructure provides persistent storage of all documents printed using the Netpage system, together with the capture and persistent storage of all digital ink written on an interactive page. When digital ink is submitted for processing, the system uses a stored description of the page to interpret the digital ink, and performs the requested actions by interacting with the applications that generated the document.

The application layer provides content to the user by publishing documents, and processes the digital ink interactions submitted by the user. Typically, an application generates one or more interactive pages in response to user input, which are transmitted to the service layer to be stored, rendered, and finally printed as output to the user. The Netpage system allows sophisticated applications to be developed by providing services for document publishing, rendering, and delivery, authenticated transactions and secure payments, handwriting recognition, and user validation using biometric techniques such as signature verification.

There are some existing techniques for matching hand-drawn ink queries with handwritten text databases, hand-drawn sketches, and image databases, as mentioned below.

Chans et al. (Y. Chans, Z. Lei, D. Lopresti, and S. Kung, "A Feature Based Approach For Image Retrieval by Sketch", *Proceedings of SPIE Volume* 3229: *Multimedia Storage and Archiving Systems II*, 1997), match hand-drawn sketches with image features based on "edge segments modeled by Implicit Polynomials (IP)". A similarity computation is based on calculating the distances between pairs of feature sets (called curvlets) using an elastic matching procedure.

Lopresti and Tomkins (D. Lopresti and A. Tomkins, "Temporal-Domain Matching of Hand-Drawn Pictorial Queries", *Handwriting and Drawing Research: Basic and Applied Issues*, IOS Press, pp. 387-401, 1996, and, D. Lopresti, A. Tomkins, and J. Zhou, "Algorithms for Matching Hand-Drawn Sketches", *Proceedings of the 5th International Workshop on Frontiers in Handwriting Recognition*, pp. 223-238, 1995), describe a system for matching hand-drawn sketches against a database of sketches. Global features such as stroke length and angle traversed are extracted for each stroke in the database, from which a stroke codebook is created using vector quantization. Input sketches are matched against a database using a string block-editing algorithm that uses vector-quantized codes as primitives, see D. Lopresti and A. Tomkins, "Block Edit Models for Approximate String Matching", *Proceedings of the 2nd Annual South American Workshop on String Processing*, pp. 11-26. A similar approach using dynamic programming for ink searching is described by Poon et al. in A. Poon, K. Weber, and T. Cass, "Scribbler: A Tool for Searching Digital Ink", *Proceedings of the ACM Computer-Human Interaction*, pp. 58-64, 1994.

In D. Lopresti and A. Tomkins, "Pictographic Naming", *Proceedings of the INTERCHI '93 Conference*, 1993, Lopresti and Tomkins describe an automatic index creation algorithm for handwritten notes. Ink strokes are grouped into words and re-sampled so each point is equidistant along the ink trajectory. A set of angular and curvature features are extracted for each stroke, and the feature vectors are clustered using hierarchical clustering. A Chi-squared statistic is used to select useful index terms.

D. Lopresti and A. Tomkins, "Pictographic Naming", *Proceedings of the INTERCHI 1993 Conference*, 1993, discuss using Hidden Markov Models (HMMs) for matching pictograms, and describe a system of inexpensive discriminants that give a rough indication of similarity between ink drawings useful for database pruning. Also described is the use of a windowed dynamic-programming approach to allow a user to search a pictographically named file system.

Del Bimbo et al. (A. Del Bimbo, P. Pala, and S. Santini, "Image Retrieval by Elastic Matching of Shapes and Image Patterns", *Proceedings of IEEE Multimedia*, pp. 215-218, 1996), describe an image retrieval algorithm that uses an elastic matching shape-similarity procedure. Schomaker et al. (L. Schomaker, L. Vuurpijl, and E. de Leau, "New Use for the Pen: Outline-Based Image Queries", *Proceedings of the 5th International Conference on Document Analysis and Recognition*, pp. 293-296, 1999), present an image query technique based on hand-drawn image outlines. This algorithm uses a feature-set containing normalized point coordinates and running angles, together with an angular histogram. For recognition, a Euclidean-distance nearest-neighbor classifier is used. Muller et al. (S. Muller, S. Eickeler, and G. Rigoll, "Multimedia Database Retrieval Using Hand-Drawn Sketches", *5th International Conference on Document Analysis and Recognition*, Bangalore, India, September 1999), describe a multimedia database retrieval system that supports hand-drawn sketches of items using both shape and color. Database entries are represented as HMMs based on scale- and rotationally-invariant features, and database-pruning techniques are used to reduce search overhead.

Pavlidis et al. (I. Pavlidis, R. Singh, and N. Papanikolopoulos, "Recognition of On-Line Handwritten Patterns Through Shape Metamorphosis", *Proceedings of the 13th International Conference on Pattern Recognition*, Vol. 3, pp 18-22, 1996), use shape metamorphosis (i.e. morphing) to match both online handwritten text and online hand-drawn line figures. The signal is segmented at areas of high and low curvature, and these segmentation points are used as features to perform shape metamorphosis between the input and target shapes. The final similarity score is based on the degree of morphing required to convert the input signal to the target.

Manmatha et al. (R. Manmatha, C. Han, E. Riseman, and W. Croft, "Indexing Handwriting Using Word Matching", *Proceedings of the First ACM International Conference on Digital Libraries*, pp. 151-159, 1996), create text indices of handwritten documents by segmenting the text into words and performing similarity matching on the words by matching (using a bitmap exclusive-or) the word image with all other word images in the text. Groups of similar words are then formed into indices. Mahmood (see T. Mahmood, "Indexing of Handwritten Document Images", *Proceedings of the* 1997 *Workshop on Document Image Analysis,* 1997) uses a technique called geometric hashing (see Y. Lamdan and H. Wolfson, "Geometric Hashing: A General and Efficient Model-Based Recognition Scheme", *Proceedings of the International Conference on Computer Vision*, pp. 218-249, 1988) to index offline handwritten text using a feature representation that is invariant under affine transformation.

Kamel (see I. Kamel, "Fast Retrieval of Cursive Handwriting", *Proceedings of the 5th International Conference on Information and Knowledge Management*, Rockville, Md. USA, Nov. 12-16, 1996) describes an approach to the fast indexing and retrieval of cursive handwriting. Strokes are segmented at "each local minimum in the x-y coordinates", and converted into a feature vector based on geometric properties such as stroke length and angle traversed. The feature vectors are then mapped to a lower dimension using Karhunen-Loeve (i.e. Principal Component Analysis, see R. Duda, P. Hart, and D. Stork, *Pattern Classification*, Second Edition, John Wiley & Sons, Inc., pp. 115-117, 2001) transform, then indexed using an R-Tree (a multidimensional version of a B-Tree described in A. Guttman, "R-Trees: A Dynamic Index Structure for Spatial Searching", *Proceedings of the ACM SIGMOD*, 1994). Searching uses a voting algorithm that matches each input stroke against the stroke index. In I. Kamel, D. Barbera, "Retriving Electronic Ink by Content", *Proceedings of the* 1996 *International Workshop on Multi-Media Database Management Systems*, 1996, this technique is expanded using a two-step indexing schema that includes a filtering step and a refinement step. The filtering step uses global features to locate a hyper-rectangle in the database that is then searched using a sequential algorithm to find the most similar matches.

Aref et al. (W. Aref, D. Barbera, P. Vallabhaneni, "The Handwritten Trie: Indexing Electronic Ink", *The* 1995 *ACM SIGMOD International Conference on Management of Data*, San Jose, Calif., May 1995) use a combination of local and global features to train a set of HMMs that model letters in a handwritten trie. A beam search is used to traverse the trie, with the most promising nodes expanded at each point. In W. Aref, D. Barbera, D. Lopresti, and A. Tomkins, "Ink as a First-Class Datatype in Multimedia Databases", *Database System: Issues and Research Direction*, pp. 113-163, 1996, describe an algorithm (called ScriptSearch) to search a continuous stream of text for a handwritten phrase. The approach does not perform word segmentation; rather, it uses dynamic programming to match against a vector-quantized sequence of stroke primitives. Also described is a technique for searching large ink databases using a tree-structured index based on HMMs.

Napper et al. (in a co-pending PCT application based on Australian Provisional Patent Application No. PR8243) describe a technique for searching digital ink databases using text-based queries. The procedure uses a handwriting model generated from a training database to map query text into a writer-dependent feature set, which is then used to perform a sequential similarity search on the database.

Lopresti et al. in D. Lopresti, Y. Ma, and J. Zhou, "Document Search and Retrieval System with Partial Match Searching of User-Drawn Annotations", U.S. Pat. No. 5,832,474, disclose an automatic ink matching system. The specification describes the process of stroke segmentation, feature extraction, vector quantization, and a fuzzy matching technique using an edit-distance sequential search.

Bricklin et al. in D. Bricklin et al. "Graphic Indexing System", U.S. Pat. No. 5,867,150, describe a method of creating handwritten note indices under the direction of a user. In this system, the user indicates regions of ink to be indexed using a lasso gesture, and subsequent searching is performed manually by a user browsing the ink index gallery.

Barbera et al. in D. Barbara, W. Aref, I. Kamel, and P. Vallabhaneni, "Method and Apparatus for Indexing a Plurality of Handwritten Objects", U.S. Pat. No. 5,649,023, describe a B-Tree data structure used to index a set of left-to-right HMMs, with each HMM representing a handwritten object. In D. Barbara and I. Kamel, "Method and Apparatus for Similarity Matching of Handwritten Data Objects", U.S. Pat. No. 5,710,916, they describe another indexing system that uses a set of global stroke features and an R-Tree for indexing. In D. Barbara and H. Korth, "Method and Apparatus for Storage and Retrieval of Handwritten Information", U.S. Pat. No. 5,524,240, and, D. Barbara and W. Aref, "Method for Indexing and Searching Handwritten Documents in a Database", U.S. Pat. No. 5,553,284, they describe a number of less sophisticated HMM-based indexing methods. In W. Aref and D. Barbara, "Trie Structure Based Method and Apparatus for Indexing and Searching Handwritten Databases with Dynamic Search Sequencing", U.S. Pat. No. 5,768,423, disclosure is made of a combined HMM and trie-structure searching technique (see W. Aref, D. Barbera, P. Vallabhaneni, "The Handwritten Trie: Indexing Electronic Ink", *The* 1995 *ACM SIGMOD International Conference on Management of Data*, San Jose, Calif., May 1995).

Mahmood in T. Mahmood, "Method of Indexing Words in Handwritten Document Images Using Image Hash Tables", U.S. Pat. No. 5,953,451, discloses a method of indexing handwritten documents using geometric hashing (see T. Mahmood, "Indexing of Handwritten Document Images", *Proceedings of the* 1997 *Workshop on Document Image Analysis*, 1997).

Hull et al. in R. Hull, D. Reynolds, and D. Gupter, "Scribble Matching", U.S. Pat. No. 6,018,591, describe a technique for scribble matching that uses velocity minima for stroke segmentation. Three matching algorithms are defined; an elastic matcher, a matcher based on shape information (called a syntactic matcher), and a matcher based on height encoding using reference-line zoning (called a word matcher).

Poon et al. in A. Poon, K. Weber, and T. Cass, "Searching and Matching Unrecognized Handwriting", U.S. Pat. No. 5,687,254, describe a method for searching and matching gesture-based handwriting using dynamic time warping. This technique is used for creating indices of handwritten documents and for performing "find and replace" functions on handwritten text.

This highlights a need for an electronic filing system using pen-based computing that allows users to store or index data in the form of notes or annotations, etc., and subsequently search this data based on handwritten (i.e. hand-drawn) queries.

DISCLOSURE OF INVENTION

According to a broad form of the present invention, there is provided a method of providing an electronic filing system which is searchable using a handwritten search query, the method including the steps of:

obtaining the handwritten search query using an input device;

performing a search of at least one database based on a comparison between the handwritten search query and handwritten annotations made on interactive pages stored in the at least one database; and, providing the results of the search to a user and facilitating access to at least one interactive page identified in the results of the search.

Preferably, the handwritten search query is obtained from the interaction of the input device with an interactive page. According to a further preferred form, the input device is an imaging pen.

In a particular embodiment of the present invention, the handwritten search query effects a search of the at least one database for a combination of handwritten annotations and content of interactive pages. In a further particular embodiment of the present invention, the handwritten search query causes a search to be performed for a handwritten annotation within a given physical distance of a selected string of text. In yet a further particular embodiment of the present invention, the handwritten search query is formed by a hand-drawn loop, underline, squiggle, cross, circumflex, asterisk and/or the like, associated with a text string on an interactive page.

According to a particular embodiment of the present invention, the interactive page is provided to the user in the form of printed paper. Alternatively, the interactive page is displayed to the user on a display device. Preferably, the handwritten annotations are user handwriting, symbols, drawings, indicia or the like.

According to a further embodiment of the present invention, additional attributes are utilised to improve searching; and the additional attributes could include:

the date or time when a handwritten annotation was made;

the particular input device used;

the geographic location where a handwritten annotation was made;

the physical location of a handwritten annotation on the interactive page;

the software application used; and/or the type of field in which a handwritten annotation was made.

According to yet another embodiment of the invention, the at least one database can be searched remotely via a network. The at least one database may be a digital image database containing pictures, drawings, images, figures or the like.

According to yet another specific embodiment of the invention, when the search query is an ink query, the search is performed by:

segmenting the handwritten annotations in the at least one database into segmented strokes and mapping the segmented strokes into a first sequence of feature representations;

segmenting the handwritten search query into segmented strokes and mapping the segmented strokes into a second sequence of feature representations;

performing an edit distance calculation on the first sequence of feature representations and the second sequence of feature representations; and, determining matches between the handwritten annotations in the at least one database and the handwritten search query by locating the smallest values from the edit distance calculation.

According to a another broad form of the present invention, there is provided a method of providing an electronic filing system which is searchable using a handwritten search query, the method including the steps of:

capturing digital ink using an imaging pen to form a handwritten search query;

submitting the handwritten search query to at least one database;

performing a search of the at least one database based on a comparison between the handwritten search query and handwritten annotations made on interactive pages stored in the at least one database; and, providing the results of the search and facilitating access to copies of interactive pages identified in the results of the search.

According to still a further broad form of the present invention, there is provided apparatus for providing an electronic filing system which is searchable using a handwritten search query, the apparatus including:

(1) at least one database for storing interactive pages;
(2) an input device;
(3) means for providing or displaying an interactive page;
(4) a processor, the processor being adapted to:
  (A) receive the handwritten search query from the input device;
  (B) submit the handwritten search query to the at least one database;

whereby, a search of the at least one database is performed based on a comparison between the handwritten search query and handwritten annotations made on interactive pages stored in the at least one database, and the results of the search are provided or displayed to a user.

According to still a further broad form of the present invention, there is provided apparatus for providing an electronic filing system which is searchable using a handwritten search query, the apparatus including:

(1) at least one database for storing interactive pages;
(2) an imaging pen for generating digital ink which forms the handwritten search query;
(3) means for a user to access an interactive page;
(4) a processor, the processor being adapted to:
  (A) receive the handwritten search query from the imaging pen;
  (B) submit the handwritten search query to the at least one database;

whereby, a search of the at least one database is performed based on a comparison between the handwritten search query and handwritten annotations made on interactive pages stored in the at least one database, and the results of the search can be accessed by the user.

BRIEF DESCRIPTION OF FIGURES

The present invention should become apparent from the following description, which is given by way of example only, of a preferred but non-limiting embodiment thereof, described in connection with the accompanying figures, wherein.

MODES FOR CARRYING OUT THE INVENTION

Figure 1:
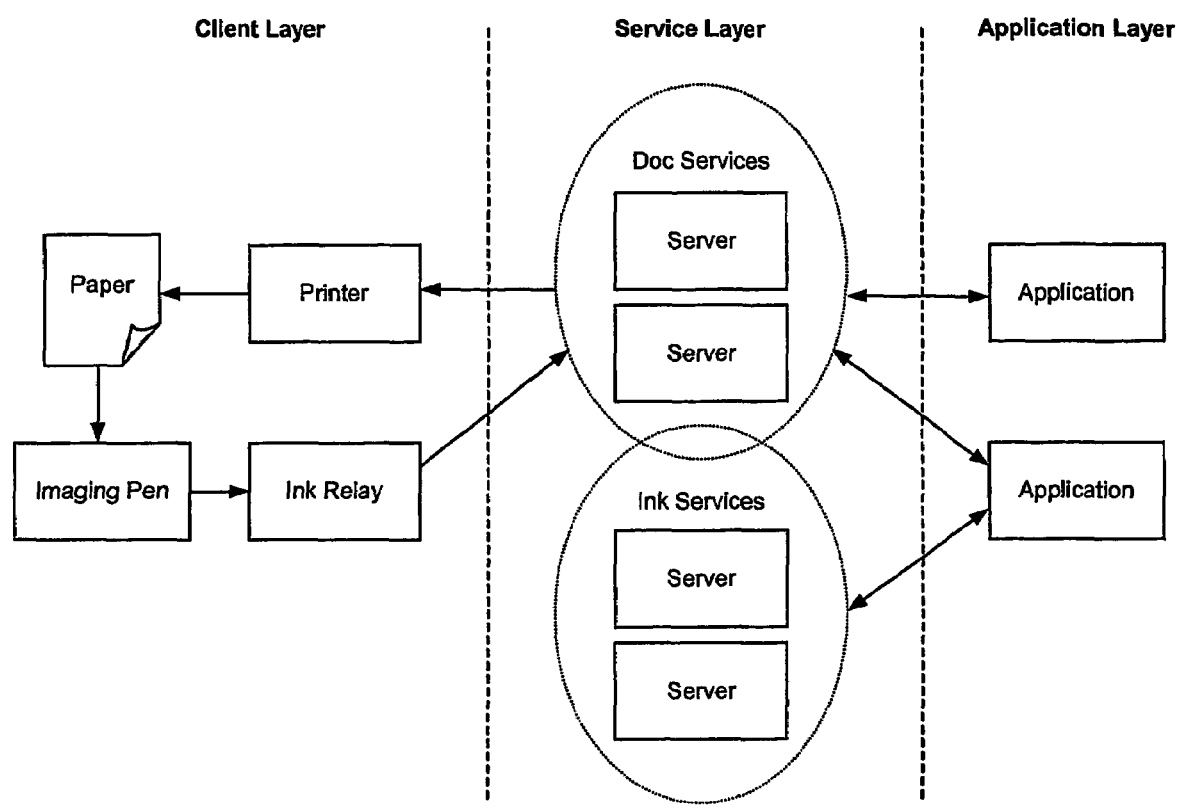
FIG. 1 (Prior Art) illustrates the Netpage system architecture.

The following modes are described as applied to the written description and appended claims in order to provide a more precise understanding of the subject matter of the present invention.

I. Preferred Embodiment

The present invention provides a method and apparatus for providing an electronic filing system which is searchable by, or indexed by, a handwritten search query, i.e. a digital ink search query.

Digital Ink Searching

A number of highly desirable services are possible by the combination of the digital ink persistence and digital ink searching. Since all information that is written or drawn on an interactive page by a user is permanently stored, the user is able to search annotations, notes, comments, and other handwritten information for keywords or diagrams, allowing fast and convenient access to all written information. Additionally, a physical copy of the handwritten information does not need to be retained, since handwriting and drawings can be easily located in the persistent database and reproduced.

The digital ink searching procedure is not limited to simply matching the query text, and additional attributes can be used to more accurately specify the desired information. Examples of these attributes include: date and time of writing, the pen used to produce the writing, geographic location where the writing took place, application with which the writing is associated (e.g. electronic mail or notebook), type of field that contains the writing (e.g. a text input field, a drawing field), the location of the annotation or text on the page, and so on.

In addition to this, complex queries can be constructed by combining both handwritten annotations and document content. Examples of this include searching for a handwritten annotation that is within a certain distance on the page of a string of printed text, or a hand-drawn lasso or loop (i.e. an elliptical loop gesture) that contains a certain printed text string.

This facilitates the ability to index any document using annotations. For example, the functionality of a "virtual filing cabinet" is made possible by annotating documents with one or more categorical descriptions. The user simply writes a description or one or more keywords on a document from any source (e.g. pages in notebook, articles in newsprint or technical journals, correspondence with colleagues), and digital ink searching can be used at a later date to locate and reproduce this information. This system allows a level of organization, indexing, and retrieval that goes well beyond that provided by a traditional filing system, since documents can be indexed by any number of categories, searching can be performed automatically (rather than by hand), and the information is available from anywhere that provides access to the online system.

Pen-based queries also allow searching for information other than handwriting. Hand-drawn picture searching can be used to locate drawings and diagrams in a notebook, and can be used to search a collection of digital images. As an example, a hand-drawn picture query could be used to search an online photo album or commercial image library for pictures that contains a desired visual feature or set of visual features.

Figure 2:
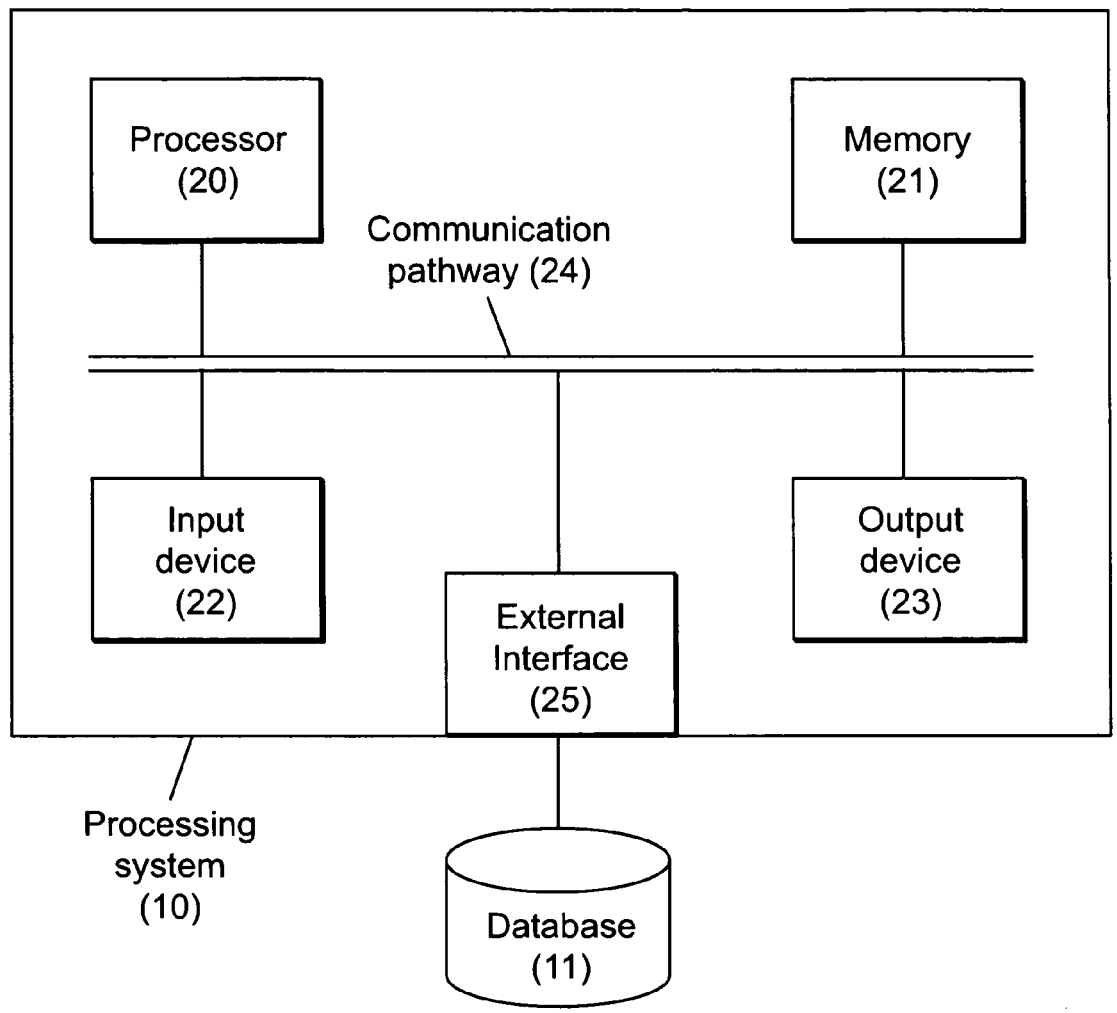
FIG. 2 illustrates a processing system.

This embodiment of the present invention can be realised using a processing system an example of which is shown in FIG. 2. In particular, the processing system 10 can be used to provide the 'client layer' facilities illustrated in FIG. 1. The processing system 10 generally includes at least a processor 20, a memory 21, and an input device 22, such as the Netpage coded paper (eg. interactive page) and imaging pen, an output device 23, such as a printer or a display, with parts coupled together via a bus or other communication path 24 as shown. An external interface is also provided as shown at 25, for coupling the processing system to a database 11. The database 11, at least in part, contains searchable digital ink.

In an alternate embodiment, the input device 22 can be an interactive page provided by a monitor or display. The monitor or display could be touch sensitive to trace the location of a pen, or could utilise other systems, such as a light-pen or position sensitive pen, to facilitate the input of handwritten or hand-drawn data.

In use, the processing system 10 is adapted to allow data to be stored in and/or retrieved from the database 11. The processor 20 receives a search query, e.g. an ink query, etc., via the input 22. From this, it will be appreciated that the processing system 10 may be any form of processing system or terminal such as a computer, a laptop, server, specialised hardware, or the like.

Digital ink searching refers to the process of searching through a continuous stream of ink for patterns that most closely match an input query according to some similarity criteria.

The digital ink searching procedure allows matching on substrings (e.g. "scope" should match "telescope" and "microscope"), words, and phrases. Additionally, Boolean search operators such as AND, OR, and NOT are supported. The procedure can also support searching databases of cursive, printed, and mixed (i.e. a mixture of both cursive and printed elements) handwriting, and preferably should be insensitive to upper and lower case distinctions.

Possible algorithms for ink searching when the search query is an ink query presented herein are evaluated by comparing the recall precision (i.e. accuracy of results), performance, and database storage and processing overhead. The precision metric used herein is simply the sum of the ranks of the correct terms as returned by the search algorithm, normalized by the number of queries performed, giving the average correct term position. For example, if the search algorithm returns the correct location for a series of queries at ranks 0 (i.e. first), 1, and 2, then the precision metric is (0+1+2)/3=1, indicating that the correct result is, on average, ranked second. Clearly, lower precision values are superior to higher values.

The trial database used for the determination of optimal procedures as discussed herein consisted of fifteen pages (approximately 4,000 words) of cursive and printed text written by a single writer using a CrossPad Portable Digital Notepad. In addition to this, 135 written queries were created using a Wacom Intuos graphics tablet, each of which consists of a handwritten word or sequence of words that can be found in the database text. The page and stroke offset of the correct location of the matching text in the database was recorded to allow the precision metric to be calculated for the search algorithms.

Preprocessing

The orientation of each page of text was first normalized using the Hough transform, as described in A. Rosenthal, J. Hu and M. Brown, "Size and orientation normalization of on-line handwriting using Hough transform", *ICASSP'97*, Munich, Germany, April 1997, resulting in roughly horizontal lines of text. A number of alternate orientation normalization schemes could also be used, including a modified version of the procedure described in M. Morita, S. Garnes, J. Facon, F. Bortolozzi, J. Facon, and R. Sabourin, "Mathematical Morphology and Weighted Least Squares to Correct Handwriting Baseline Skew", *Fifth International Conference on Document Analysis and Recognition (ICDAR'99)*, Bangalore (India), 20-22 September 1999, pp. 430-433.

To perform line segmentation, potential line segmentation points were first detected using the temporal sequence of the ink strokes. Generally, new lines can be detected in Latin scripts by identifying movements downward and to the left. However, other line jumps are possible, such as a signature in a document where the pen displacement may be downwards and to the right. As a result, any significant downward displacement is treated as a potential line break.

To perform line segmentation, the bounding box of a stroke is compared to the base line of the current line, which is calculated using a horizontal projection histogram that identifies the zones of the text, see R. Powalka, "Extracting and using reliable zoning information", Internal Report. Department of Computing, The Nottingham Trent University, 9 Dec., 1993. If the stroke bound falls below the base line, a line break hypothesis is created. To verify the hypothesis, a new line is created and the text zones are calculated for the strokes up until the next line break hypothesis. If the zones of new line fall entirely below the zones of the previous line, the hypothesis is confirmed and the line break is accepted. Otherwise, the line break is rejected and strokes are merged back into the previous line. Processing continues until all strokes on a page have been processed. The result of the line segmentation procedure is a set of stroke groupings that represent each line, together with the zoning information for each line.

Substring Search

Digital ink searching is defined as locating all instances of the ink query in an ink database. However, traditional database searching and indexing schemes are not suitable for digital ink searching, since handwriting exhibits a large degree of variability in shape and structure. Since a word written twice by the same author will contain differences in the number and order of strokes, and in the shape and location of those strokes, an approximate string matching technique such as the edit distance calculation, see R. Wagner and M. Fischer, "The String-to-String Correction Problem", *Journal of the Association for Computing Machinery*, 21(1), pp. 168-173, 1974, should be used.

The edit distance calculation $d(X,Y)$ is defined as the minimum cost required to transform sequence $X=\{x_1,\ldots,x_m\}$ into sequence $Y=\{Y_1, \ldots, y_n\}$ using only symbol insertion, deletion, and substitution operations, and can be solved using dynamic programming:

$d_{0,0}=0$ $d_{i,0}=d_{i-1,0}+c_{ins}(x_i)$  $1 \leq i \leq m$ $d_{0,j}=d_{0,j-1}+c_{del}(y_j)$  $1 \leq j \leq n$ and for $1 \leq i \leq m$ and $1 \leq j \leq n$:

$$d_{i,j} = \min \begin{cases} d_{i-1,j} + c_{ins}(x_i) \\ d_{i,j-1} + c_{del}(y_i) \\ d_{i-1,j-1} + c_{sub}(x_i, y_i) \end{cases}$$

The standard edit distance algorithm given above requires the sequence X to match the entire length of Y. However, searching for a sequence X as a subsequence of Y requires a change to the calculation to allow the query sequence to begin matching at any point in the database sequence:

$d_{0,j}=0$

To perform digital ink searching, the ink query and digital ink database are each mapped to a sequence of primitive elements, and the edit distance calculation is performed on the sequences. The cost values $C_{del}(x_i)$ and $c_{ins}(y_i)$ are defined to be the length of the ink $x_i$ that is inserted or deleted, while $c_{sub}(x_i,y_i)$ is taken to be the Euclidean distance between the two strokes (unless otherwise specified).

Matches in the digital ink database are found by finding the smallest values of $d_{m,j}$ and tracing the minimum-cost path back to the start of the sequence match, where the page number and stroke offset of the match can be found. These matches are recorded and ranked by score. Note that a matching sequence may generate multiple matches since the insertion or deletion of nearby strokes may produce a number of low-scoring closely clustered results. As a result, only the minimum value within a certain window is reported as the matching score.

II. Further Examples

The following examples provide a more detailed outline of one possible means to provide the digital ink searching function. These examples are intended to be merely illustrative and not limiting of the scope of the present invention. Other forms of searching are possible.

Stroke Segmentation

To perform approximate string matching, the digital ink database and ink query are segmented into a sequence of primitive elements. A number of standard stroke segmentation schemes were tested, using 8 zone-normalized coordinates (described in Table 2) as features. For all segmentation methods, segmentation points were only used if both sub-strokes created by splitting the stroke at that point were greater than a minimum length (derived from the zone height). The results are summarized in Table 1:

TABLE 1

Stroke segmentation results

| Segmentation Scheme | Precision |
|---|---|
| Y minima | 19.47 |
| Y extrema | 3.04 |
| Angular extrema | 20.23 |

Segmentation at the extrema of the Y coordinates produced the most accurate results. Note that the processing overhead for this segmentation method is also higher than for the other schemes, since many more segmentation points (and thus sub-stroke elements) are found, leading to many more steps in the sequential search procedure. However, the improved accuracy of this method as reflected by the precision results makes the overhead worthwhile.

Feature Selection

To perform the similarity matching between the ink query and the database sequences, the segmented strokes are mapped to a feature representation that allows distance calculations to be performed. A number of common feature representations were tested:

TABLE 2

Feature selection results

| Name | Description | Precision |
|---|---|---|
| Bound-normalized coordinates | The coordinates of the sub-stroke re-sampled to 8 equidistant points and normalized by the bounding rectangle of the entire stroke. | 39.34 |
| Zone-normalized coordinates | The coordinates of the sub-stroke re-sampled to 8 equidistant points with the Y coordinates normalized by the middle zone and the X coordinates normalized by the width of the bounding rectangle of the sub-stroke. | 3.04 |
| Curvature | 8 angles representing the curvature of the equidistantly resampled sub-stroke along its length. | 35.01 |
| Angles | 8 angles representing the directions of the equidistantly resampled sub-stroke along its length. | 30.20 |
| NICI features | The feature set proposed by the Nijmegen Institute for Cognition and Information (NICI) (as defined in L. Schomaker, H. Teulings, E. Helsper, and G. Abbink, "Adaptive recognition of online, cursive handwriting", Proceedings of the Sixth | 5.23 |

TABLE 2-continued

Feature selection results

| Name | Description | Precision |
|---|---|---|
| | International Conference on Handwriting and Drawing. Paris, July, 4-7: Telecom, (pp. 19-21), 1993). This feature set includes 9 angular, 3 Cartesian, and 2 structural features. Note that the Cartesian features were normalized by the zone height and multiplied by a weighting factor (set to 1.8 for this experiment based on previous optimization experiments). | |
| Rubine features | The feature set proposed by Dean Rubine in the context of gesture recognition (see D. Rubine, "Specifying Gestures by Example." Computer Graphics, pp. 329-337, July 1991) and applied to digital ink searching in W, Aref, D. Barbera, D. Lopresti, and A. Tomkins, "Ink as a First-Class Datatype in Multimedia Databases", Database System: Issues and Research Direction, pp. 113-163, 1996. This feature set uses 13 primarily global features to described the stroke (note that last two features based on dynamic information were not used). | 6.90 |

Due to the highly correlated nature and large variation in magnitude of the features in the Rubine set, the Mahalanobis distance (see R. Duda and P. Hart, *Pattern Classification and Scene Analysis*, Wiley Interscience, 1973) was used as the distance metric for the search procedure when using these features:

$$d^2 = (x-y)'\Sigma^{-1}(x-y)$$

where $\Sigma$ is the covariance matrix derived from the features in the database.

Surprisingly, the zone-normalized coordinate method produced the highest search precision of the feature representations tested. This feature set was used for all subsequent experiments.

Parameter Optimization

Figure 3:
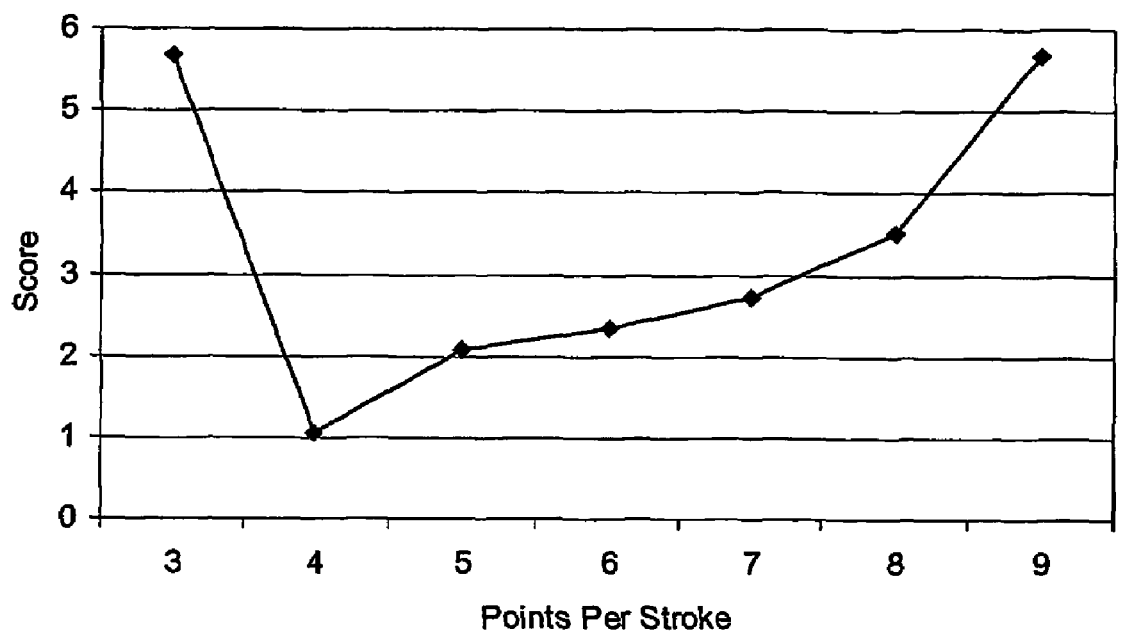
FIG. 3 presents a graph showing the optimization of points per stroke.

Having determined the stroke segmentation scheme and feature representation, experiments were undertaken to optimize the feature generation parameters. To do this, the search procedure was run repeatedly with a single parameter modified at each step. FIG. 3 depicts the results of varying the number of points per sub-stroke, with the optimal value found to be 4 (i.e. 8 features per sub-stroke).

Figure 4:
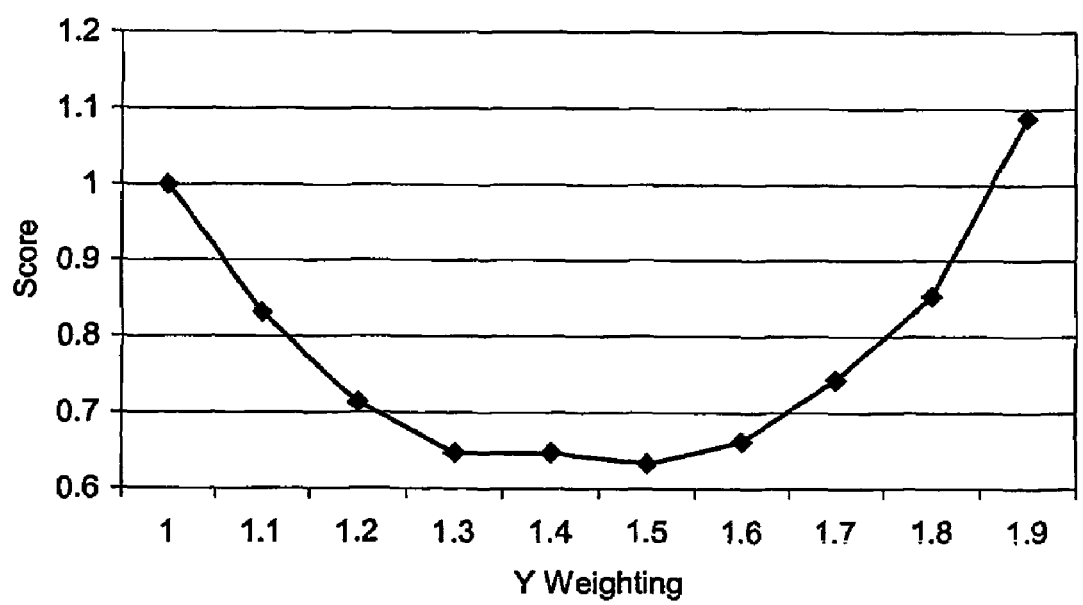
FIG. 4 presents a graph showing the optimization of Y weighting.

Studies of the generation of handwriting based on properties of the human motor system (see L. Schomaker and H. Teulings, "A Handwriting Recognition System based on the Properties and Architectures of the Human Motor System" *Proceedings of the International Workshop on Frontiers in Handwriting Recognition (IWFHR)* pp. 195-21 1. Montreal: CENPARMI Concordia, 1990) suggest that the vertical components of strokes (i.e. Y coordinates) have the highest SNR and contain more information than the horizontal components. To exploit this, a range of weightings are applied to the Y coordinates of the features, with the results displayed in FIG. 4. The optimal value for the Y weighting was found to be about 1.5.

The ratio between the insertion/deletion costs ($c_{del}$ and $c_{ins}$) and the substitution cost ($c_{sub}$) will affect the optimal path calculation and thus the accuracy of the search procedure. This ratio can be modified by the application of a weight $\alpha$ such that:

$$d_{i,j} = \min \begin{cases} d_{i-1,j} + c_{del}(x_i) \\ d_{i,j-1} + c_{ins}(y_i) \\ d_{i-1,j-1} + \alpha c_{sub}(x_i, y_i) \end{cases}$$

Figure 5:
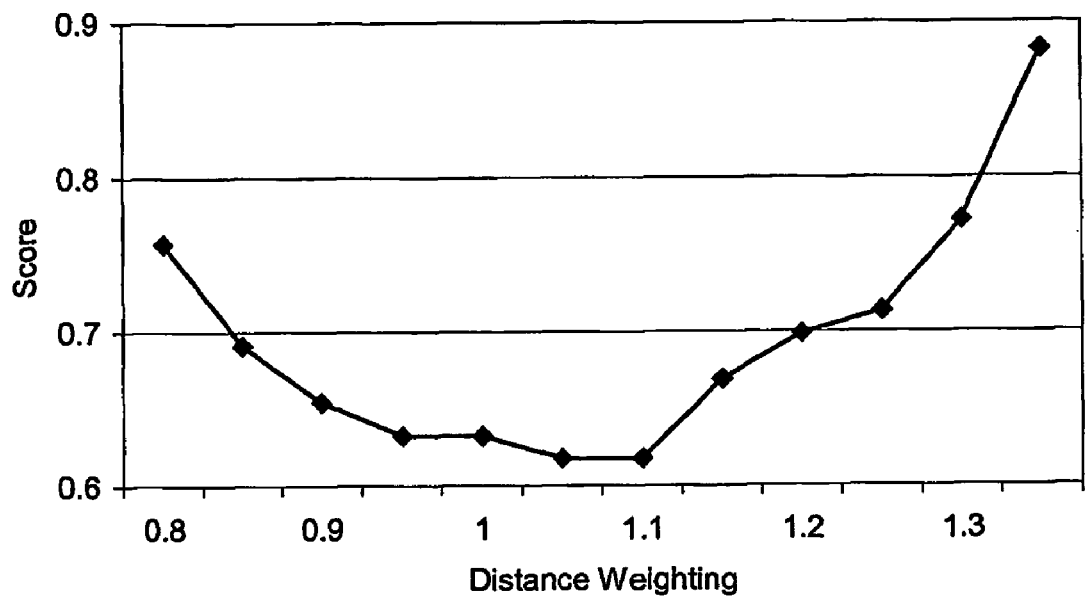
FIG. 5 presents a graph showing the optimization of substitution weighting.

FIG. 5 depicts the results of varying the substitution weight parameter, however using a weight of 1 (i.e. no weighting) produces close to optimal results.

Performance Optimization

By profiling the searching procedure, it is observed that the majority of the time is spent in the Euclidean distance calculation. To improve performance, squared Euclidean distance with a weighting factor is used instead, producing similar precision with a 25% speed improvement. Additional improvements are gained by unrolling the squared Euclidean distance calculation.

Figure 6:
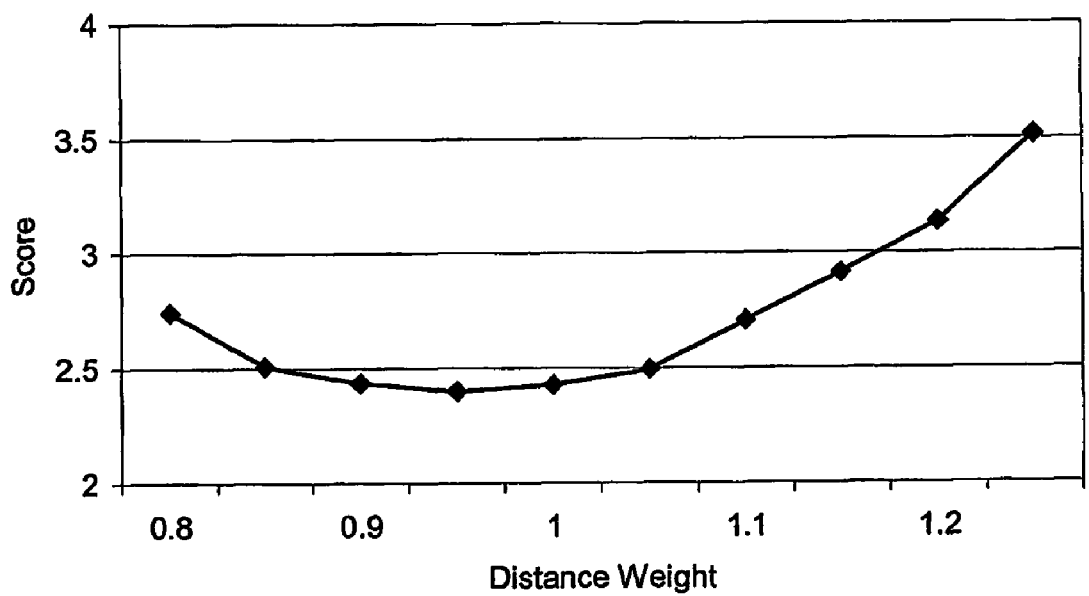
FIG. 6 presents a graph showing the optimization of VQ distance weighting.

To further improve the performance, vector quantization of the sub-strokes can be performed using standard K-means clustering (see R. Duda and P. Hart, *Pattern Classification and Scene Analysis*, Wiley Interscience, 1973), with the Euclidean distance calculation replaced by a table lookup of codeword distances (distance-weight optimization is detailed in FIG. 6). However, while this produced a 35% performance improvement over the optimal squared Euclidean distance technique, the accuracy of the search results was adversely affected. The performance optimization results are summarized in Table 3:

TABLE 3

Performance optimization results

| Optimization | Performance | Precision |
|---|---|---|
| Euclidean distance | 1.00 | 0.67 |
| Squared Euclidean distance | 0.76 | 0.64 |
| ED loop unrolled | 0.61 | 0.64 |
| Vector quantization | 0.39 | 2.43 |

Full Stroke Matching

The experiments described above allowed matching of the query against an arbitrary substring within the search database. However, disallowing sub-stroke matches and requiring strokes to be matched completely or not at all can achieve superior precision results. To do this, $d_{0,j}=0$ is set for all columns in the search matrix that represent the first sub-stroke in a stroke, and:

$$d_{0,j}=d_{0,j-1}+c_{del}(y_j)\ 1\leq j\leq n$$

otherwise.

Additionally, scores are only computed at stroke boundaries (i.e. after the entire stroke in the database has been matched). Using this method, the accuracy of the search is increased, with a precision result of 0.17 as compared to the previous best of 0.64 given above. Table 4 shows these results, along with the rank of the worst match and the percentage of queries where the correct result was ranked $1^{st}$:

TABLE 4

Full stroke matching results

| Name | Precision | Worst Rank | Ranked $1^{st}$ |
|---|---|---|---|
| Sub-stroke matching | 0.64 | 24 | 82% |
| Full-stroke matching | 0.17 | 8 | 93% |

Clearly, if sub-stroke matching is not required for the search, forcing strokes to be fully matched can lead to more accurate query results.

Hence, improved search results are achieved using a matching procedure based on strokes segmented at Y extrema, with each sub-stroke represented by a feature set of the zone-normalized coordinates, preferably of four equidistant points. Additional gains in accuracy are possible by weighting the Y coordinates in the feature set. Using a full-stroke matching procedure, 93% of the queries returned the correct location as the best match, with the worst result ranking the correct location at the eighth position.

All the algorithms discussed perform searching in linear time. Superior performance may be achievable using indexing or filtering techniques.

Additionally, word boundaries could be analyzed that may be useful for improving word-level matching. Similar techniques may also be applied to searching image databases using hand-drawn queries.

Thus, there has been provided in accordance with the present invention, a method and apparatus for providing an electronic filing system which is searchable by, or indexed by, a handwritten search query.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Although the preferred embodiment has been described in detail, it should be understood that various changes, substitutions, and alterations can be made herein by one of ordinary skill in the art without departing from the scope of the present invention as hereinbefore described and as hereinafter claimed.

The invention claimed is:

1. A method of providing an electronic filing system which is searchable using a handwritten search query, the method including the steps of:

obtaining the handwritten search query using interaction of an input device;

obtaining a text search query including a text search term;

performing a search of at least one database for instances of the text search term;

performing a search of the at least one database for handwritten annotations that are a given physical distance from each of at least one of the instances of the text search term;

comparing the handwritten search query and the handwritten annotations in order to determine matches between the handwritten search query and the handwritten annotations; and, providing results of the comparing step to a user and facilitating access to at least one page upon which the handwritten annotations appear.

2. The method as claimed in claim 1, wherein an interactive page identified in the results of the search is displayed to a user on a display device.

3. The method as claimed in claim 1, wherein the handwritten annotations are one or more of handwriting, symbols, drawings, and indicia.

4. The method as claimed in claim 1, wherein the input device is an imaging pen.

5. The method as claimed in claim 1, wherein the handwritten search query is one of a hand-drawn loop, underline, squiggle, cross, circumflex, and asterisk, associated with the text string.

6. The method as claimed in claim 4, wherein the comparing step comprises the sub-steps of:

segmenting the handwritten annotations in the at least one database into segmented strokes and mapping the segmented strokes into a first sequence of feature representations;

segmenting the handwritten search query into segmented strokes and mapping the segmented strokes into a second sequence of feature representations;

performing an edit distance calculation between the first sequence of feature representations and the second sequence of feature representations; and, determining matches between the handwritten annotations in the at least one database and the handwritten search query by locating the smallest values from the edit distance calculation.

7. The method as claimed in claim 6, wherein the edit distance calculation uses sub-stroke insertion, sub-stroke deletion and/or sub-stroke substitution.

8. The method as claimed in claim 6, wherein segmentation at the vertical-axis (Y) extrema coordinates of strokes is utilized.

9. The method as claimed in claim 6, wherein the mapping of the segmented strokes into the feature representations uses a zone-normalized coordinate method.

10. The method as claimed in claim 6, wherein a weighting factor is applied to the vertical-axis (Y) coordinates of the feature representations.

11. The method as claimed in claim 6, wherein the segmented strokes undergo vector quantization and the edit distance calculation is replaced by a look-up table of codeword distances.

12. The method as claimed in claim 6, wherein the method uses full stroke matching of the search query.

13. The method as claimed in claim 1, wherein the at least one database is a digital image database containing one or more of pictures, drawings, images, and figures.

* * * * *